(12) United States Patent
Machida et al.

(10) Patent No.: US 7,746,549 B2
(45) Date of Patent: Jun. 29, 2010

(54) OPTICAL COMMUNICATION APPARATUS

(75) Inventors: Naoaki Machida, Tokyo (JP); Shinji Iio, Tokyo (JP); Morio Wada, Tokyo (JP); Daisuke Hayashi, Tokyo (JP); Shinji Kobayashi, Tokyo (JP); Masayuki Suehiro, Tokyo (JP); Katsuya Ikezawa, Tokyo (JP); Akira Miura, Tokyo (JP); Sadaharu Oka, Tokyo (JP); Chie Sato, Tokyo (JP); Mamoru Hihara, Tokyo (JP); Tsuyoshi Yakihara, Tokyo (JP); Shinichi Nakajima, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 234 days.

(21) Appl. No.: 11/589,175

(22) Filed: Oct. 30, 2006

(65) Prior Publication Data
US 2007/0127112 A1   Jun. 7, 2007

(30) Foreign Application Priority Data
Oct. 31, 2005   (JP) .......................... P.2005-316180

(51) Int. Cl.
*H04B 10/17* (2006.01)
*H04B 10/12* (2006.01)

(52) U.S. Cl. ................ 359/341.43; 359/341.3

(58) Field of Classification Search ............ 359/341.43, 359/341.3
See application file for complete search history.

(56) References Cited

U.S. PATENT DOCUMENTS

| 5,442,326 | A | * | 8/1995 | Liberman ................... 331/94.1 |
| 5,570,227 | A | * | 10/1996 | Nabeyama et al. ..... 359/341.43 |
| 5,701,195 | A | * | 12/1997 | Chikama ............... 359/341.43 |
| 5,923,463 | A | * | 7/1999 | Hamada ................ 359/341.43 |
| 6,064,514 | A | * | 5/2000 | Aoki et al. ............. 359/341.43 |
| 6,486,991 | B1 | | 11/2002 | Uehara |
| 2002/0080471 | A1 | | 6/2002 | Akiyama |
| 2003/0170034 | A1 | * | 9/2003 | Shiozaki et al. ............. 398/182 |

FOREIGN PATENT DOCUMENTS

| JP | 2002-26874 A | | 1/2002 |
| JP | 2002261360 A | * | 9/2002 |
| JP | 2003-179552 A | | 6/2003 |
| WO | WO 99/50979 A2 | | 10/1999 |

OTHER PUBLICATIONS

Search Report dated Feb. 22, 2007.

* cited by examiner

*Primary Examiner*—Eric Bolda
(74) *Attorney, Agent, or Firm*—Sughrue Mion, PLLC (57) ABSTRACT

An optical communication apparatus includes an erbium-doped optical fiber amplifier for amplifying a modulated optical signal, wherein a light which is not modulated is inputted to the erbium-doped optical fiber amplifier together with the optical signal.

5 Claims, 10 Drawing Sheets

FIG. 4A
0dBmp-p GAIN 8dB

FIG. 4B
-3dBmp-p GAIN 10dB

FIG. 4C
-7dBmp-p GAIN 12dB

FIG. 4D
-10dBmp-p GAIN 14dB

FIG. 5A
0dBm GAIN 9dB

FIG. 5B
-3dBm GAIN 10dB

FIG. 5C
-7dBm GAIN 11dB

FIG. 5D
-10dBm GAIN 12dB

0dBmp-p

FIG. 10B

-3dBmp-p

FIG. 10C

-7dBmp-p

FIG. 10D

-10dBmp-p

OPTICAL COMMUNICATION APPARATUS

This application claims foreign priority based on Japanese Patent application No. 2005-316180, filed Oct. 31, 2005, the content of which is incorporated herein by reference in its entirety.

BACKGROUND OF THE INVENTION

1. Field of the Invention

The present invention relates to an optical communication apparatus, and more particularly to an optical communication apparatus in which an output waveform of an optical fiber amplifier (refer it simply to as an EDFA, hereinafter) is improved.

2. Description of the Related Art

Meeting the age of multi-media including an Internet, the optical communication network technique of a main communication system in which more improved service is desired over a wide area has been rapidly and progressively developed for an information society. Further, as the capacity of an optical communication line becomes large and the speed of the optical communication line becomes high, a receiving section of an optical transmitting system has been also requested to have a receiving function of a higher performance.

As one of components of the optical communication apparatus, an EDFA (erbium-doped optical fiber amplifier) obtained by adding an erbium ion to an optical fiber has been known.

Figure 7:
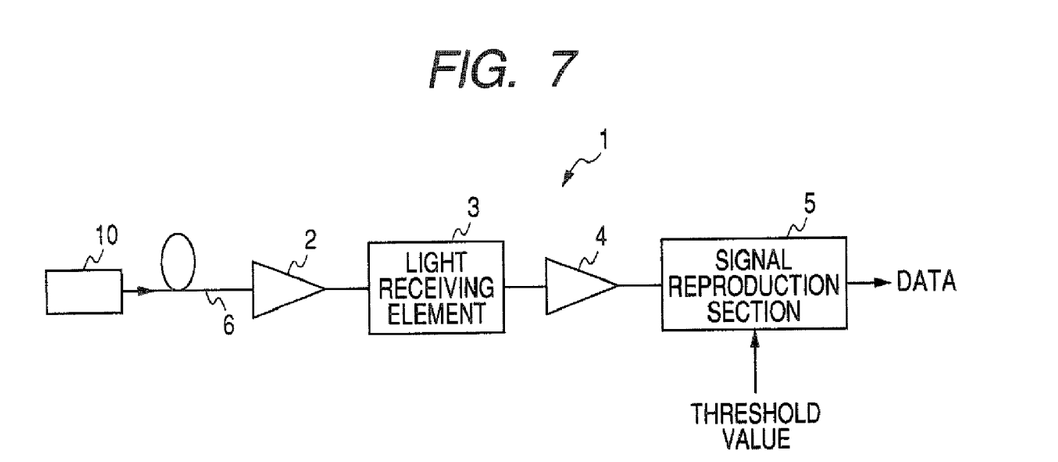
FIG. 7 is a diagram showing a basic structure of an optical communication apparatus using an EDFA.

FIG. 7 is a diagram showing a basic structure of an optical communication apparatus using the EDFA. The optical communication apparatus 1 includes the EDFA2, a light receiving element 3, an amplifier 4 and a signal reproduction section 5.

The EDFA2 receives and amplifies a signal from a modulation light source 10 that is transmitted through an optical fiber cable 6. The light receiving element 3 converts an amplified optical signal to an electric signal. The amplifier 4 amplifies the electric signal. In the signal reproduction section 5, identification of "1" or "0" is performed based on a set threshold value to reproduce data.

The EDFA has excellent features such as high gain, high output, wide band, low noise and independence of a polarized wave. Therefore, the EDFA is indispensable for a present optical fiber communication system. In the present optical communication, the EDFA is employed in a structure in which a light that is modulated by a constant rapid period is inputted to the EDFA.

Related arts using such EDFA are disclosed in JP-A-2003-179552 and JP-A-2002-026874.

However, in the EDFA, when a light is suddenly inputted from a state that the light is not inputted or a pulse-shaped light having a long period equal to or above the order of μs is inputted, a light surge appears that has an output several times to several ten times as large as an output that can be obtained from an ordinary gain or a saturated output. This phenomenon results from a fact that a relaxation time of excitation and emission in the EDFA is in the order of μs. Accordingly, there is a possibility that optical components arranged in a rear stage may be broken due to the light surge.

Figure 8:
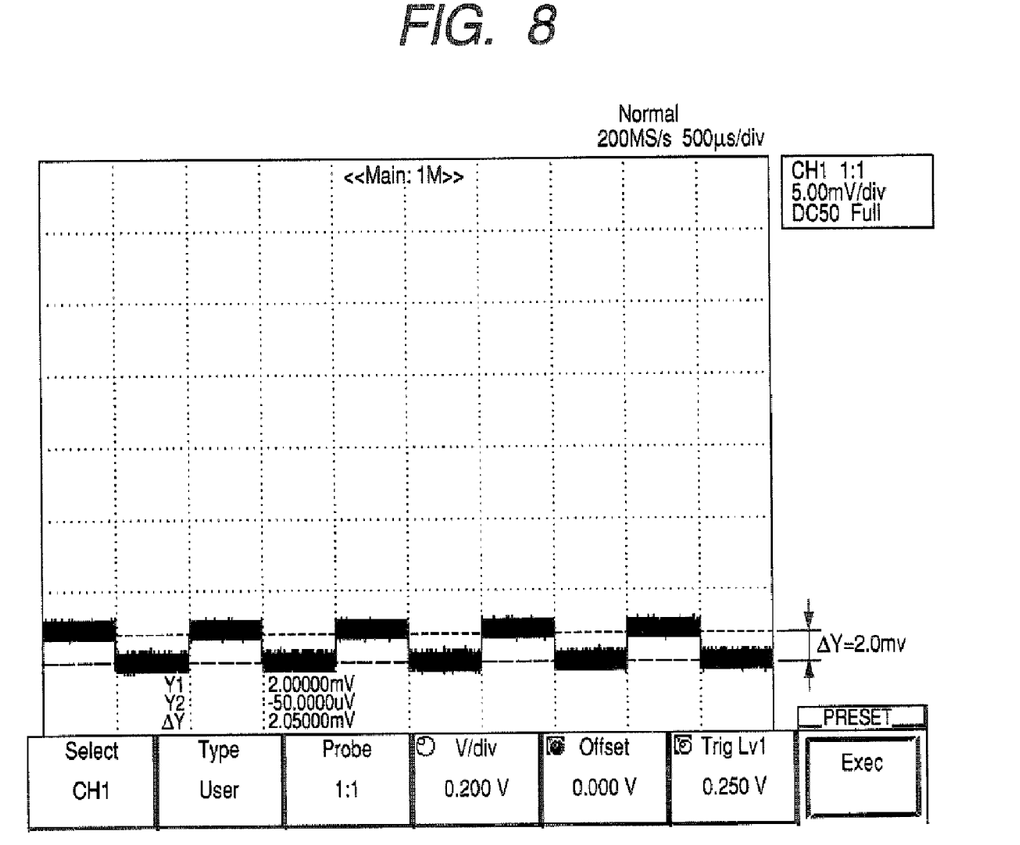
FIG. 8 is a diagram showing an input light inputted to the EDFA from a modulation light source of the optical communication apparatus shown in FIG. 7.
Figure 9:
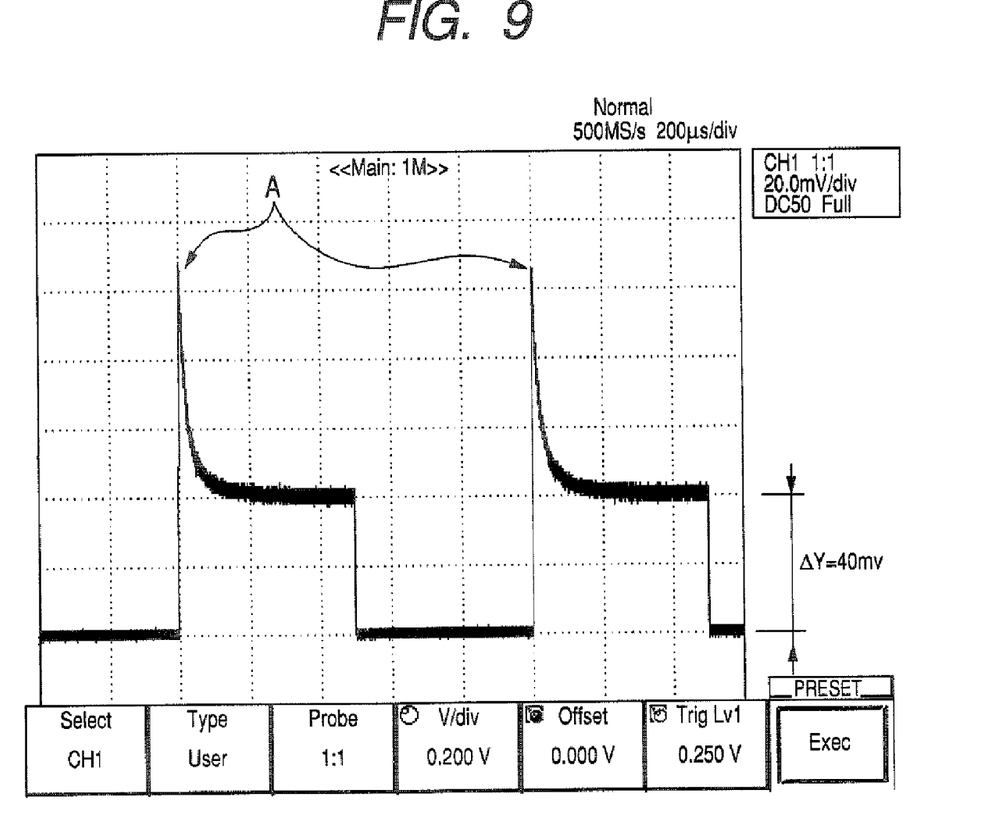
FIG. 9 shows a waveform of an output light from the EDFA of the optical communication apparatus shown in FIG. 7.
Figure 10A:
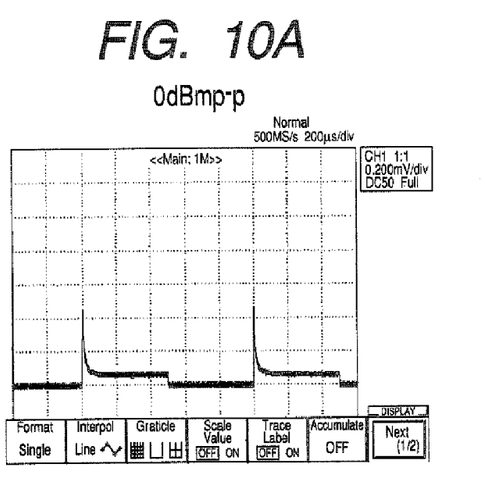
FIGS. 10A to 10D show output waveforms when the power of the input light is changed.
Figure 10B:
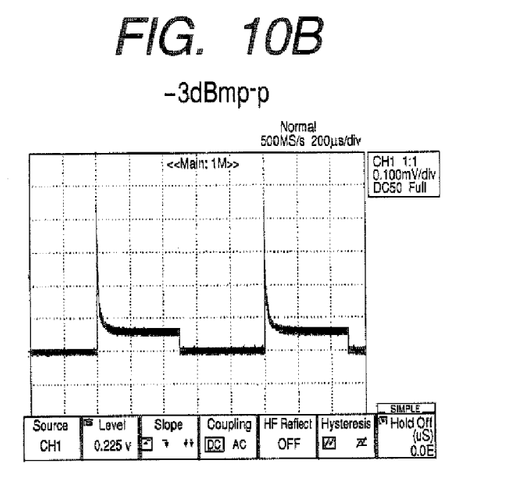
Figure 10C:
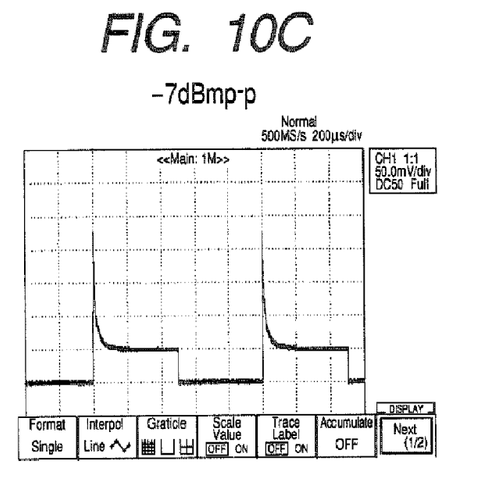
Figure 10D:
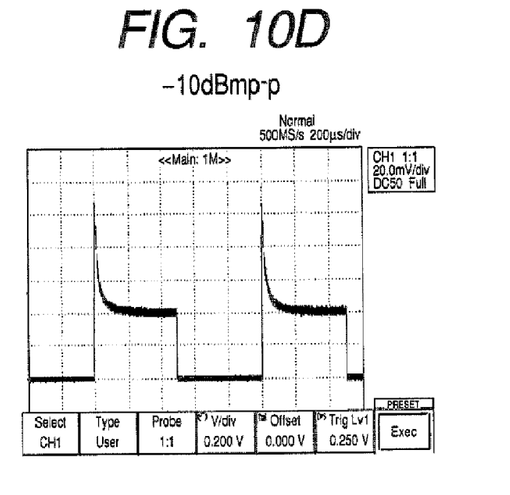

FIG. 8 shows an input light inputted to the EDFA2 from the modulation light source 10 of the optical communication apparatus 1 shown in FIG. 7. FIG. 9 shows a waveform of an output light from the EDFA2 and a state that the light inputted from the modulation light source 10 is inputted to the EDFA2 and outputted as an amplified and modulated light. In these drawings, an axis of ordinate designates a value (mv) obtained by inputting a light power to a PD (Photo Diode) and converting it to an electric signal, and an axis of abscissa designates a time (μs).

When a rectangular optical signal having a long period (1 kHz, −10 dBmp-p) ΔY=2.0 mv as shown in FIG. 8 is inputted, the output waveform is ΔY=40 mv as shown in FIG. 9, so that a large gain can be obtained. However, in a head portion of the rectangular signal, the light surge having an extremely large output exceeding 100 mv appears as shown in a part A.

FIGS. 10A-10D show output waveforms when the power of the input light is changed from 0 dBmp-p to −3 dBmp-p, to −7 dBmp-p and to −10 dBmp-p. Also in this drawing, an axis of ordinate designates a value (mv) obtained by inputting a light power to a PD and converting it to an electric signal and an axis of abscissa designates a time (μs). The frequency of a signal light at this time is set to 1 kHz. A large protrusion (surge voltage) is generated at the beginning of the waveform, which is different from a case of 10 GHz. This protrusion shows that as the power of the input light (0 dBmp-p to −3 dBmp-p, to −7 dBmp-p and to −10 dBmp-p) is large, the protrusion of the surge voltage is also large.

As described above, in the case of a wavelength of about 1 kHz, the light surge appears, however, when a modulated light in unit of GHz employed in the present optical communication is continuously inputted, the EDFA can be used as an extremely good optical amplifier.

However, in an optical switch using a label switching high in its availability as an optical communication apparatus in future, an optical burst switching network of a next generation or an optical packet switching network, a signal is intermittently inputted. Accordingly, during a time of disconnection, there is a state that the light is not inputted to the EDFA. Therefore, in an ordinary using method, the light surge is undesirably generated as shown in FIG. 9.

When the modulated light of several GHz that is used in the present optical communication is constantly and continuously inputted to the EDFA, the EDFA can be used as a very preferable amplifier. However, when a light is suddenly inputted from a state that the light is not inputted or a pulse-shaped light having a long period equal to or more than the order of μs as shown in FIG. 8 is inputted, a light surge appears that has an output several times to several ten times as large as an output obtained from an ordinary gain or a saturated output.

Accordingly, since in the optical switch using the label switching in future, the optical burst switching network of a next generation or the optical packet switching network, there is a state that the light is not inputted to the EDFA, the light surge is undesirably generated by a current using method.

SUMMARY OF THE INVENTION

The present invention has been made in view of the above circumstances, and provides a light receiving device that can greatly reduce a light surge outputted from an EDFA even when a long-pulse-shaped light is inputted.

In some implementations, an optical communication apparatus of the invention comprises an erbium-doped optical fiber amplifier for amplifying a modulated optical signal, wherein a light which is not modulated is inputted to the erbium-doped optical fiber amplifier together with the optical signal.

The optical communication apparatus of the invention further may comprise a wave filter for removing the light which is not modulated from an amplified optical signal being outputted from the erbium-doped optical fiber amplifier.

In the optical communication apparatus of the invention, a band-pass filter may be used as the wave filter.

In the optical communication apparatus of the invention, an isolator and a Fiber Bragg Grating (FBG) may be used as the wave filter.

In the optical communication apparatus of the invention, a wavelength of the light which is not modulated may be from about 1550 nm to 1568 nm.

In the optical communication apparatus of the invention, a wavelength of the light which is not modulated may be variable.

In the optical communication apparatus of the invention, the wavelength of the light which is not modulated may be variable with respect to a wavelength of the modulated optical signal.

DESCRIPTION OF THE PREFERRED EMBODIMENTS

Now, by referring to the drawings, the present invention will be described below in detail.

Figure 1A:
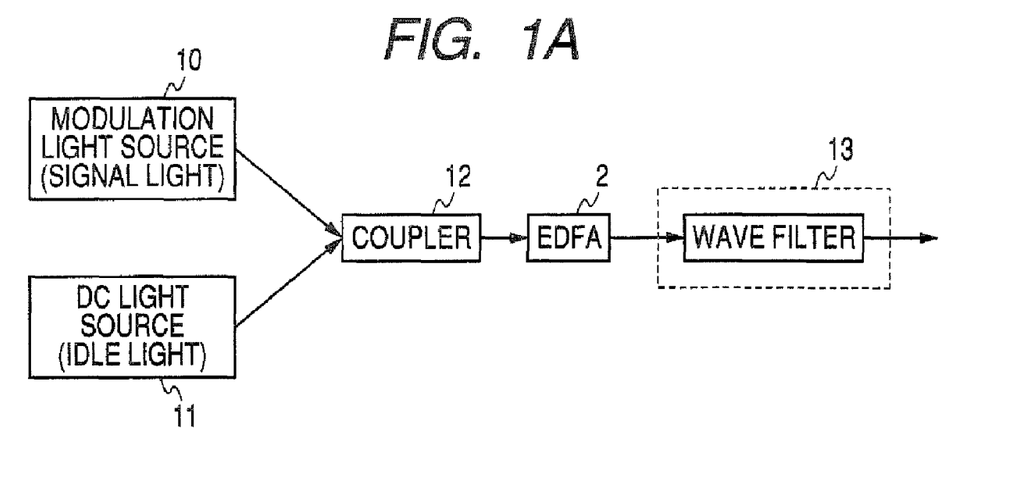
FIGS. 1A, 1B and 1C are block diagrams showing an embodiment of an optical communication apparatus according to the present invention.
Figure 1B:
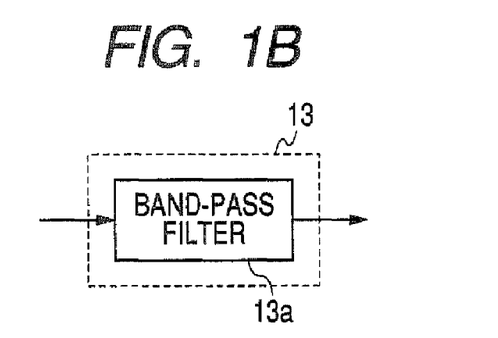
Figure 1C:
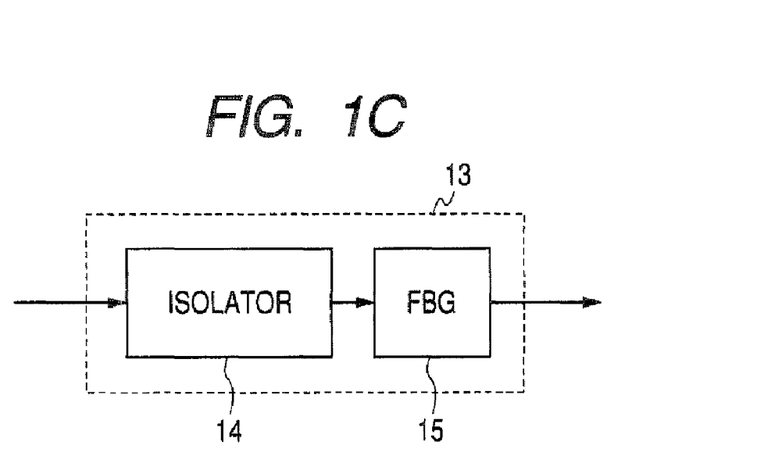

FIGS. 1A-1C are block diagrams showing an embodiment of an optical communication apparatus of the present invention. In FIG. 1A, reference numeral 10 designates a modulation light source, reference numeral 11 designates a light which is not modulated source (idle light), reference numeral 12 designates a coupler to which a signal light and an idle light are inputted. Reference numeral 2 designates an EDFA to which the signal light and the idle light outputted from the coupler are inputted. Reference numeral 13 designates a wave filter for blocking the idle light in an output from the EDFA2 so as to output the light to a light receiving element (not shown) arranged in a rear stage.

FIGS. 1B and 1C show specific examples of the wave filter 13. FIG. 1B shows the example using a band-pass filter 13a, and FIG. 1C shows the example using an isolator 14 and an FBG (Fiber Bragg Grating) 15.

In FIG. 1A, a light having different wavelength is inputted to the EDFA2 together with a modulated light. The output of the light having the different wavelength is cut by the wave filter 13. Here, an input modulated light desired to be amplified is referred to as a signal light and a light which is not modulated having the different wavelength is referred to as an idle light. The idle light is a laser beam that is constantly inputted to the coupler 12 as a light of a prescribed wavelength.

Since the idle light is constantly inputted, even when a light is suddenly inputted from a state that the signal light is not inputted, the generation of a light surge can be prevented.

Figure 2:
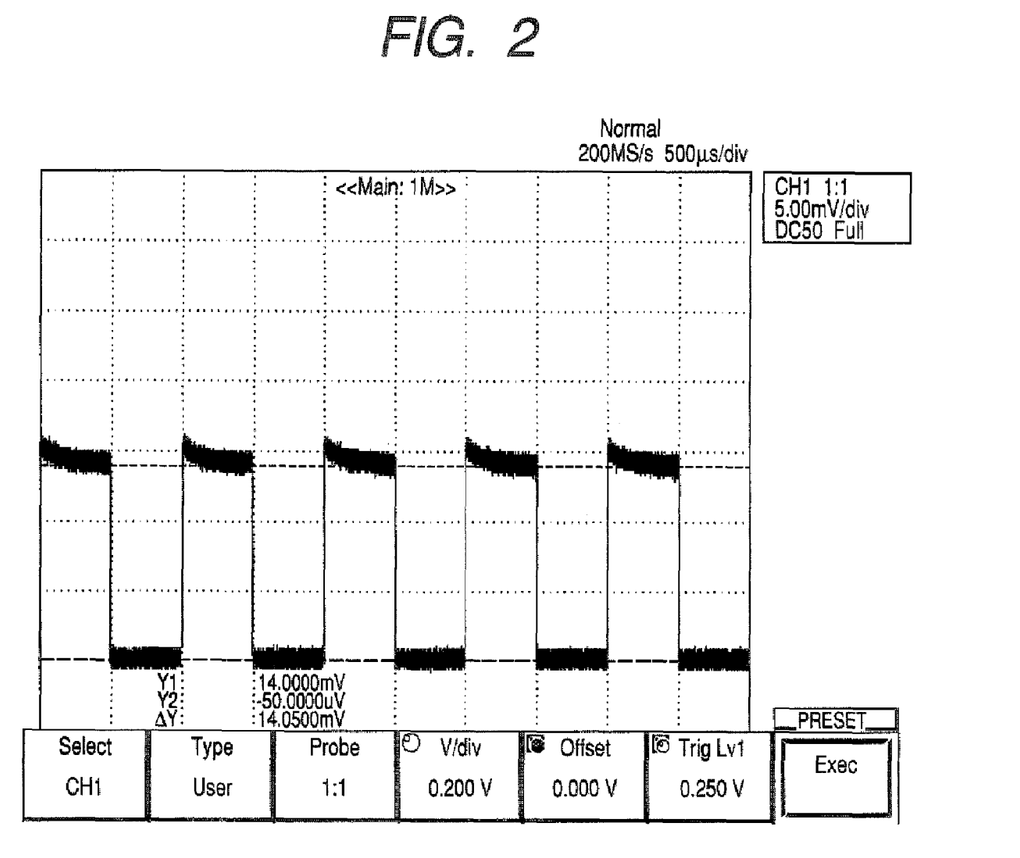
FIG. 2 shows an output waveform when an idle light having a wavelength of 1560 nm is inputted to an EDFA2 together with a modulated light.

FIG. 2 shows a waveform of an output when the idle light having the wavelength of 1560 nm is inputted to the EDFA2 together with the modulated light and indicates a case that an output signal after the idle light is transmitted to the wave filter 13 shown in FIG. 1 is measured. When FIG. 2 is compared with FIG. 9 in which the idle light is not inputted to the EDFA2, it is recognized that the light surge is greatly reduced and the waveform of the output is more greatly improved.

FIGS. 3A-3H show relations between the wavelength of the idle light and the output of the signal light. Here, results are shown that are obtained by inputting as the signal light the rectangular optical signal having a long period (1 kHz, −10 dBmp-p) $\Delta Y=2.0$ mv as shown in FIG. 8 to intermittently change the wavelength of the idle light to 1526 to 1572 nm.

Figure 3A:
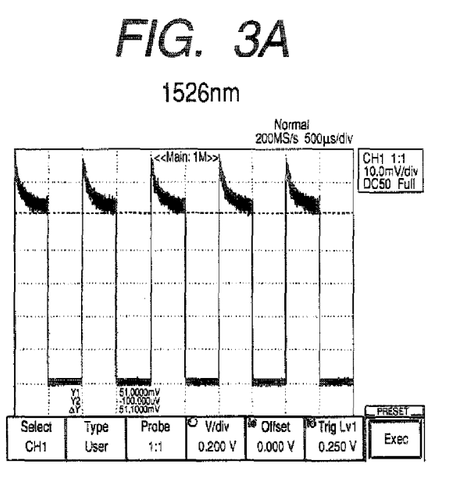
FIGS. 3A to 3H show relations between the wavelength of the idle light and the output of a signal light.

That is, as shown in FIG. 3A, when the idle light having the wavelength of 1526 nm is inputted, an output voltage is high as large as $\Delta Y=51$ mv, however, it is found that a strong surge voltage (about 20 mv) is generated at the beginning of the waveform.

Figure 3B:
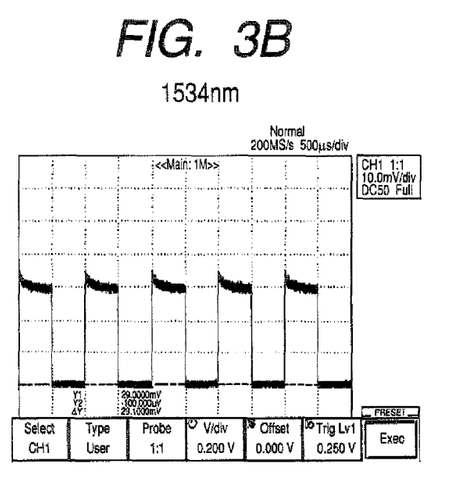

Then, when the input wavelength of the idle light is 1534 nm, the output voltage is $\Delta Y=29$ mv or so as shown in FIG. 3B and is lower than the output voltage when the wavelength of 1526 nm shown in FIG. 3A is inputted, however, it is obviously understood that the surge voltage is about 5 mv and considerable improvement is recognized.

Figure 3C:
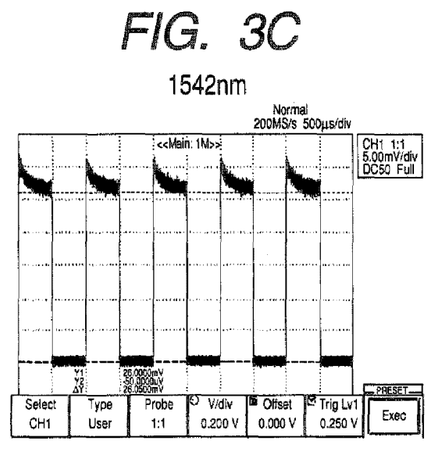

Then, as shown in FIG. 3C, when the idle light having the wavelength of 1542 nm is inputted, the output voltage is $\Delta Y=26$ mv or so. However, it is found that the surge voltage (about 5 mv) is generated at the beginning of the waveform, though the surge voltage is not so strong as shown in FIG. 3A.

Figure 3D:
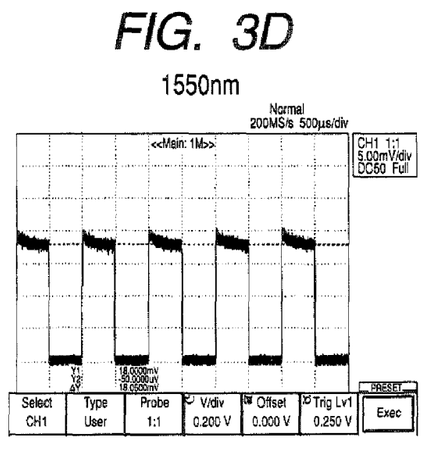

Then, when the input wavelength of the idle light is 1550 nm, the output voltage is $\Delta Y=18$ mv or so as shown in FIG. 3D and it is obviously understood that considerable improvement can be recognized on the surge voltage (about 3 mv).

Figure 3E:
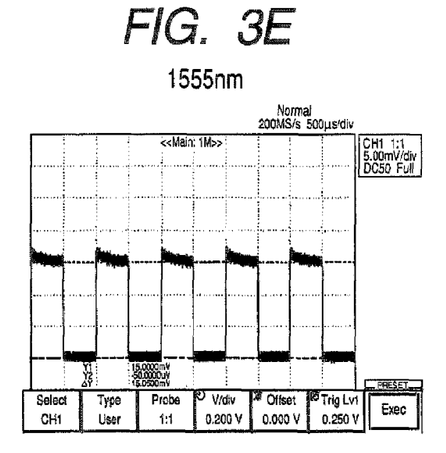

Then, when the input wavelength of the idle light is 1555 nm, the output voltage is low as small as $\Delta Y=15$ mv or so as shown in FIG. 3E, however, it is obviously understood that considerable improvement can be recognized on the surge voltage (about 3 mv).

Figure 3F:
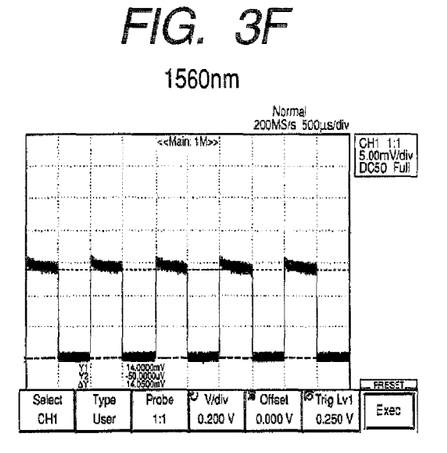

Then, when the input wavelength of the idle light is 1560 nm, the output voltage is $\Delta Y=14$ mv or so as shown in FIG. 3F, however, it is obviously understood that further improvement can be recognized on the surge voltage is about 2 mv.

Figure 3G:
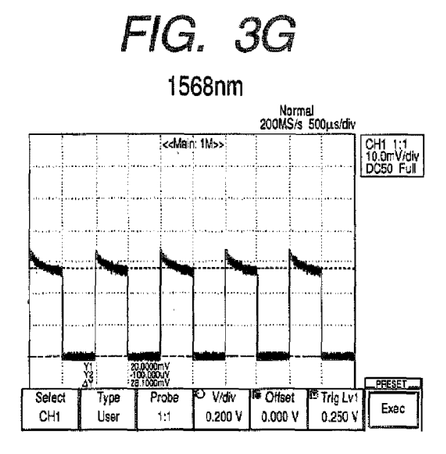

Then, as shown in FIG. 3G, when the idle light having the wavelength of 1568 nm is inputted, the output voltage is $\Delta Y=28$ mv or so and it is found that the surge voltage (about 5 mv) is generated at the beginning of the waveform.

Figure 3H:
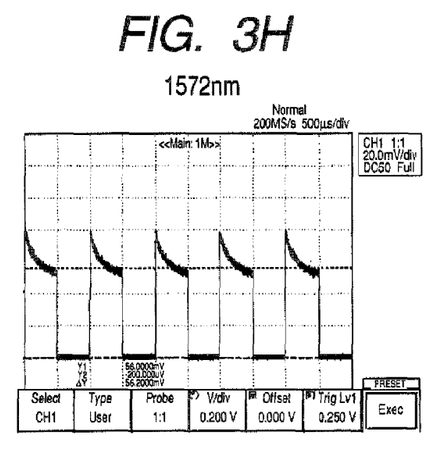
Figure 4A:
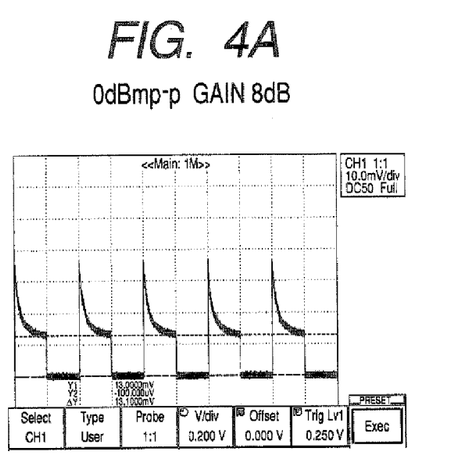
FIGS. 4A to 4D show dependence of an output waveform on the power of the signal light.
Figure 4B:
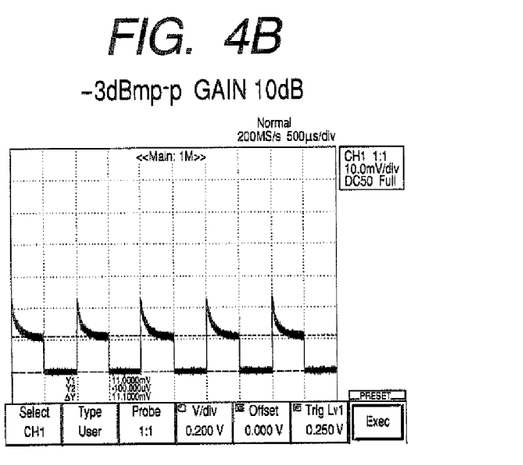
Figure 4C:
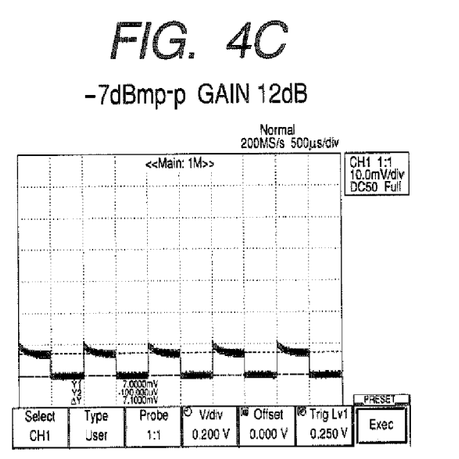
Figure 4D:
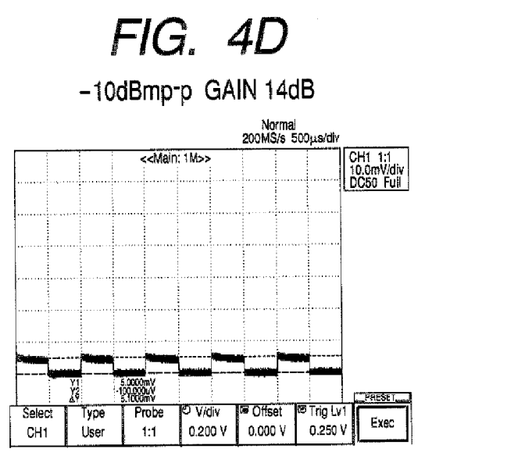
Figure 5A:
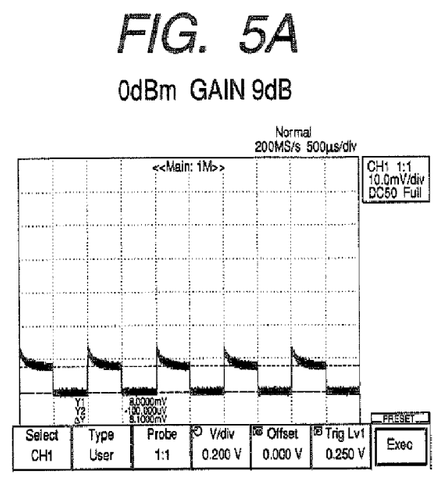
FIGS. 5A to 5D show dependence of the output waveform on the power of the idle light.
Figure 5B:
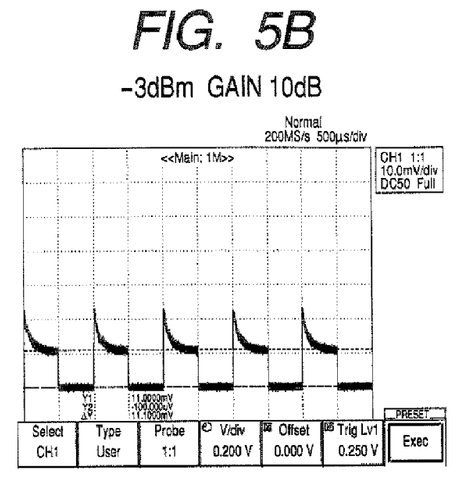
Figure 5C:
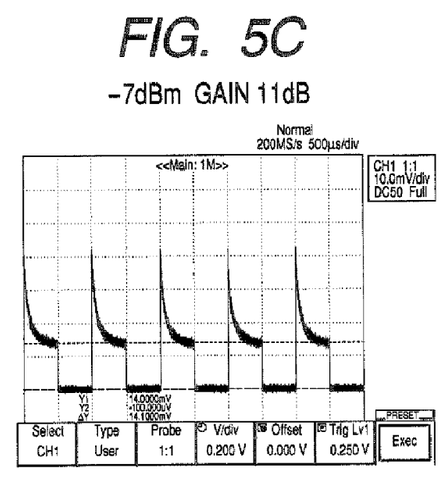
Figure 5D:
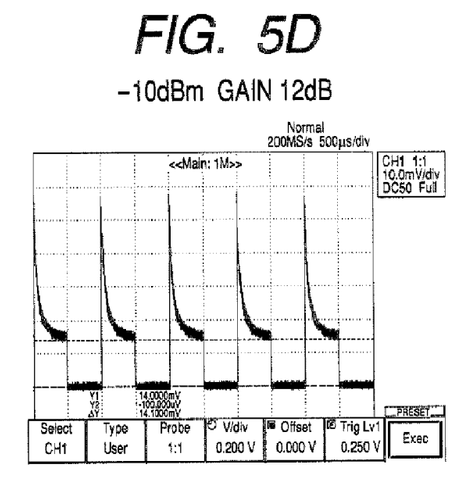

Subsequently, as shown in FIG. 3H, when the idle light having the wavelength of 1572 nm is inputted, the output voltage is $\Delta Y=56$ mv or so and it is found that the strong surge voltage (about 25 mv) is generated at the beginning of the waveform.

From the above-described results, it can be decided that when the wavelength of the idle light inputted to the coupler 12 ranges from about 1550 nm to 1568 nm or so, an influence of a surge voltage is hardly received.

Accordingly, in the present invention, the wavelength of the idle light inputted to the coupler is set to about 1550 nm to 1568 nm, and desirably set to about 1560 nm.

FIGS. 4A-4D show dependence of the output waveform on the power of the signal light. In this case, the light power of the idle light is set to −3 dBmp-p and the wavelength is set to 1542 nm. According to the drawings, it is recognized that as the signal light is decreased, the surge (a protrusion) becomes smaller and a gain is increased.

FIGS. 5A-5D show dependence of the output waveform on the power of the idle light. In this case, the power of the signal light is set to −3 dBmp-p and the wavelength is set to 1542 nm. According to the drawings, it is recognized that as the power of the idle light is increased, the surge (a protrusion) becomes smaller and a gain is more decreased.

As apparent from FIGS. 4A-4D and 5A-5D, when the power of the idle light is increased and the power of the signal light is decreased, the waveform is more improved.

Specifically, in the structure shown in FIG. 1, when the input power of the idle light is changed (for instance, decreased), the gain relative to the signal light can be changed (for instance, increased). Then, such an operation is used so that the EDFA2 can be allowed to function as a variable gain amplifier.

Figure 6:
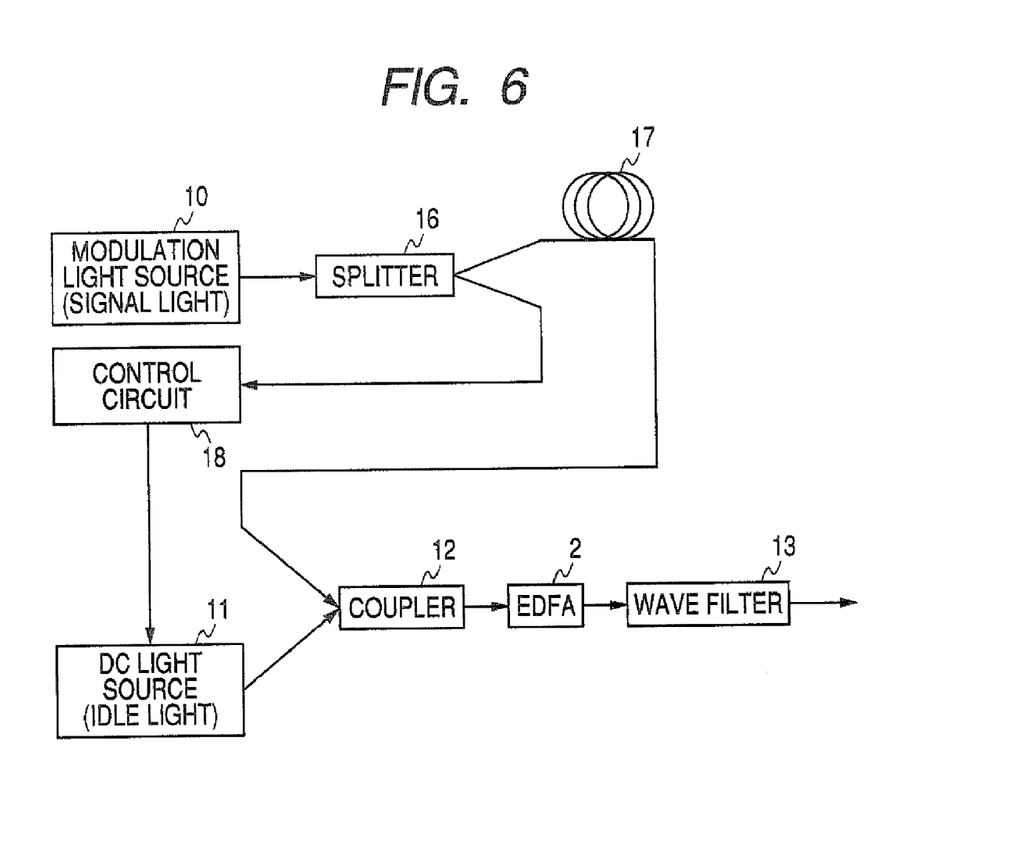
FIG. 6 shows that an output of an EDFA is stabilized by measuring a light power of a signal light by using an optical amplifier shown in FIG. 1 to increase or decrease a power of an idle light correspondingly to the measured value.

FIG. 6 shows that the output of an EDFA is stabilized by measuring the light power of a signal light by the use of an optical amplifier shown in FIG. 1 to increase or decrease the power of an idle light correspondingly to the measured value.

The output stabilizing operation functions even when the signal light becomes a burst or a packet signal.

In FIG. 6, a splitter 16 is arranged in a rear stage of a modulation light source (a signal light) 10 to split the signal light to two directions. One optical signal split by the splitter 16 is inputted to a coupler 12 through a delay section 17. Further, the other optical signal is inputted to a control circuit 18 to control the power of a light source (an idle light) in association with the output of the control circuit. Here, the delay section 17 functions as a delay element to meet the delay of the signal until the other split optical signal passes through the control circuit 18 and is inputted to the coupler 12 via the idle light source.

In the structure of FIG. 6, the signal light is inputted to the control circuit 18 through the splitter 16. The control circuit 18 measures the power of the signal light. Then, since the light power of the idle light is controlled in accordance with a measurement result, the idle light having an optimum power can be inputted to an EDFA2 in association with the signal light to stabilize the output of the EDFA2.

According to the optical communication apparatus of the invention, since the non-modulated light is inputted to the EDFA together with the optical signal, the light surge of an output can be reduced.

According to the optical communication apparatus of the invention, since the non-modulated light is removed from the optical signal being amplified by the EDFA by using a wave filter, only the amplified optical signal can be detected.

According to the optical communication apparatus of the invention, since the wavelength of about 1550 nm to 1568 nm is used, the light surge of the output can be reduced.

According to the optical communication apparatus of the invention, since the wavelength of the light which is not modulated can be varied in association with the wavelength of the modulated optical signal, even when the wavelength of the optical signal is changed, the light which is not modulated having a proper wavelength can be inputted to effectively suppress a surge.

The above description merely presents a specific preferred embodiment for the purpose of explaining the present invention and exemplification.

Accordingly, the present invention is not limited to the above-described embodiment and further includes many changes and modifications within a scope without departing from its essence.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

[FIG. 1A]
10 modulation light source (signal light)
11 DC light source (idle light)
12 coupler
13 wave filter

[FIG. 1B]
13a. band-pass filter

[FIG. 1C]
14 isolator

[FIG. 6]
16 splitter
18 control circuit
17 delay section
10 modulation light source (signal light)
11 DC light source (idle light)
12 coupler
13 wave filter

[FIG. 7]
3 light receiving element
5 signal reproduction section
1 threshold value
2 data

What is claimed is:

1. An optical communication apparatus comprising:
   an erbium-doped optical fiber amplifier configured for amplifying a modulated optical signal,
   wherein a light which is not modulated is inputted to the erbium-doped optical fiber amplifier together with the optical signal,
   wherein a wavelength of the light which is not modulated is variable with respect to a wavelength of the modulated optical signal.

2. The optical communication apparatus according to claim 1, further comprising:
   a wave filter for removing the light which is not modulated from an amplified optical signal being outputted from the erbium-doped optical fiber amplifier.

3. The optical communication apparatus according to claim 2, wherein a band-pass filter is used as the wave filter.

4. The optical communication apparatus according to claim 2, wherein an isolator and a Fiber Bragg Grating (FBG) are used as the wave filter.

5. The optical communication apparatus according to claim 1, wherein a wavelength of the light which is not modulated is from about 1550 nm to 1568 nm.

* * * * *